Nov. 16, 1965 N. N. GARKIN ETAL 3,217,560

MEMORY FOR PROGRAMMED OPERATING CONTROLS

Filed April 19, 1963

INVENTORS
N. N. GARKIN
A. I. PIMENOV
A. M. SHAROVSKY

BY Glascock, Downing & Seebold
ATTORNEYS

United States Patent Office 3,217,560
Patented Nov. 16, 1965

3,217,560
MEMORY FOR PROGRAMMED OPERATING CONTROLS

Nikolai Nikolaievich Garkin, Pervomajiskaia St. 80, Appt. 33; Alexei Ivanovich Pimenov, Arsenjevsky bystreet 2, Appt. 24; and Arkadi Mikhailovich Sharovsky, Vorontsovskaia St. 21–a, Appt. 31, all of Moscow, U.S.S.R.

Filed Apr. 19, 1963, Ser. No. 274,897
4 Claims. (Cl. 74—568)

The present invention is related to automation and computers, and to be more exact, it relates to electromechanical memories, and in particular programmed operating controls.

The memories now in use are complicated in design, whereas their employment in command and program equipment, control panels, and more particularly in electromechanical program arrangements, wherein a combination of electric circuits is produced by displacement of mechanical contactors (memories), does not ensure reliable operation.

Attempts were made to overcome the above shortcomings, but they failed, whereas we have solved this problem and brought the solution into effect.

Therefore an object of this invention is to provide a memory that is simple in design.

Another object of the present invention is the provision of a memory ensuring reliable operation of arrangements incorporating said memory without additional elements or means to adjust the same.

With respect to the above and other objects the invention is confined to a new design and combination of arrangement components, disclosed and submitted as a patentable claim, which is hereunder described and demonstrated. It will be understood that modifications in the exact embodiment of the invention disclosed herein may be introduced within the scope of the claims without departing from the idea of the present invention.

For better understanding of the present invention and its efficiency, reference is made hereunder to the accompanying drawing in which:

FIGS. 1 and 1*a* are sectional views of the memory in two operating positions (I and II).

Figure 1:
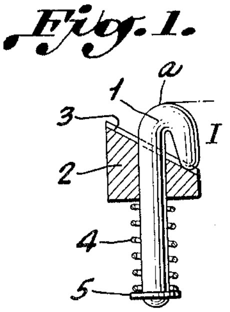

The memory comprises a rod 1 having an asymmetric head "*a*," for cooperation with a wedge 2, whose slant or inclined surface has a groove 3 therein. A spring 4, surrounds the rod and is biased between the undersurface of wedge 2 and a washer 5 (consult FIG. 1). The head "*a*" of the rod is manufactured as a hook. When the rod 1 turns through 180° the memory changes from position I to position II, and the rod moves through a distance "*h*" axially of the rod, i.e. relative to the base that supports the wedge 2, see FIG. 4.

Figure 2:
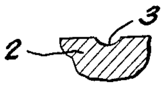
FIG. 2 is a fragmentary, transverse sectional view illustrating a groove cut on the slant surface of the wedge shown in FIGS. 1 and 1*a*.
Figure 3:
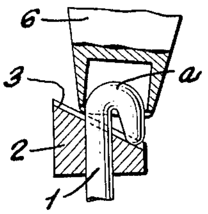
FIG. 3 is a fragmentary sectional view illustrating the adjustment operation of the memory as performed with the aid of a socket wrench.

The position of the head of rod 1 relative to the slanted or inclined surface of the wedge is adjusted, as shown in FIG. 3, by the aid of socket wrench 6. Thus, with reference to FIGS. 1 and 2, when the wrench is applied over the head "*a*" of the rod and turned relative to the wedge as fixed in space on a support as shown in FIG. 4, the nose or end surface of the hook-shaped portion of the rod slides out of groove 3 riding over the inclined face of the wedge and by reason of the resilient mounting as affected by spring 4, the nose of the rod assumes the position shown in FIG. 1*a* where it is again lodged in the groove 3 but at a position 180° from the position shown in FIG. 1.

Figures 5, 5A:
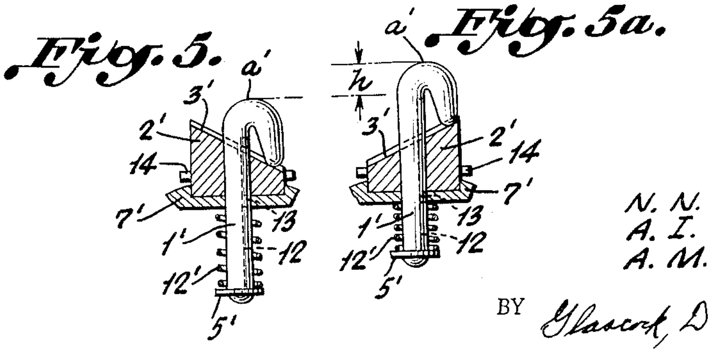
FIGS. 5 and 5*a* are views similar to FIGS. 1 and 1*a* but illustrating a modified form of the invention.

Basically, therefore, the memory of the invention comprises the combination of a rod having a head including an outer switch element contacting surface and an axially inner surface or nose displaced laterally of the axis of the rod and cooperating with the groove 3 in the inclined surface of the wedge. The two positions of the head of the rod are inoperative and operative positions and are effected by relative rotary movement between the rod and the wedge. FIG. 5 and FIG. 5*a* illustrate a modification in which the rod is in effect stationary on its axis relative to the wedge and the wedge is rotatable relative to its support. In this form of the invention, the drum 7′ is recessed or socketed to acommodate a wedge 2′ having the proper inclined surface with the groove 3′ therein. On the exterior of the wedge are suitable protuberances 14 adapted to cooperate with a wrench or similar tool whereby the wedge can be rotated or turned relative to the support or drum 7′. The nose or inner end of the hook-shaped head of rod 1′ is disposed in the groove 3 as shown at the end in these two figures. The rod is provided with the washer 5′ and a spring 12′ is biased between this washer and an inner surface of the drum. A longitudinal groove or keyway 12 is provided in rod 1′ and a key 13 is formed to extend inwardly of the aperture in the drum 7′ that accommodates the rod. Thus, when the wedge is turned, the rod only moves axially relative to the drum 7′. The inoperative and operative positions of the rod are respectively illustrated in FIGS. 5 and 5*a* similar to the showing in FIGS. 1 and 1*a*, the difference being that the nose on the hook-shaped portion of rod 1′ remains on the same lateral side of the axis of rod 1′.

The present invention may be particularly applicable in program controls. Such a unit comprising new memories is shown in FIG. 4, where the memories have been disposed along the generatrix of a drum 7 in several rows. The memories are operative to actuate the contactor series 8.

Figure 1A:
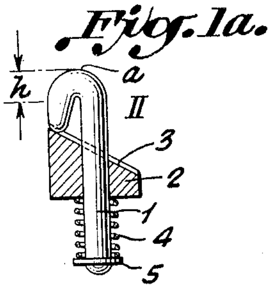
Figure 4:
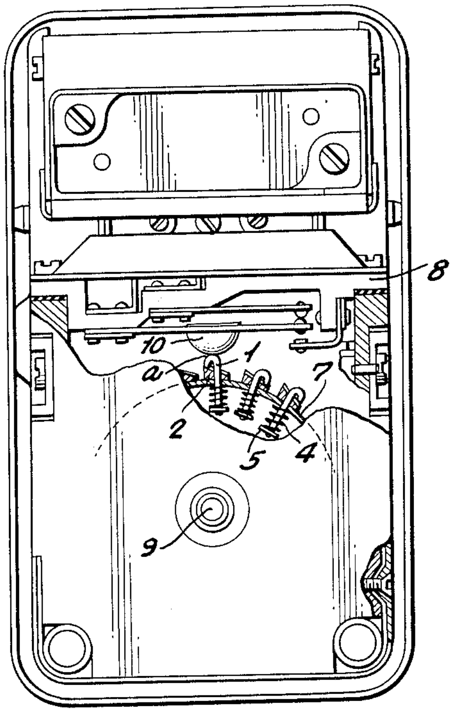
FIG. 4 is a diagrammatic view illustrating the program controls based on the memory of the invention.

In the arrangement of FIG. 4 the memories or cooperative rod and wedge means of the invention are arranged in a plurality of rows extending circumferentially of drum 7. The number of memories in each row are correlated with the number of contactor units 8, each associated with an electric circuit. The number of rows around the circumference of the drum determine the number of switch actuating combinations that can be stored in the device. It is believed clear, therefore, that as the drum rotates relative to the rows of contactor or switch units 8, certain ones of the memory devices in each row in the position shown in FIG. 1*a* will engage the button 10 or head on the movable contact of the associated series 8 to complete a circuit. Certain others in each row being in the position shown in FIG. 1 and pass beneath the button 10 so that the circuit of the associated contacter arrangement 8 is not closed. Therefore, each memory, regardless of whether the rod is turned relative to the wedge or wrench is turned relative to the rod, has two positions;

(a) the non-operating position wherein upon rotation of the drum 7 about the axis 9 no electric contact is achieved (FIG. 1, position I) since the upper surface of the rod passes beneath the button 10;

(b) the operating position, wherein upon rotation of the drum the upper surface of the rod of the memory engage button 10 to close the respective circuit (FIG. 1, position II). Hand adjustment of the unit is very simplified so as to be readily achieved by means of a wrench and under any circumstances within the time required for adjustment by a turning unit.

What we claim is:

1. A memory for use in actuating a movable component of a programmed operating control system comprising a rod having a head including an outer component engaging surface and an inner surface displaced axially inwards of the first-mentioned surface and extending laterally of the axis of the rod, a wedge means surrounding said rod inwardly of the head and including a slanting surface, said second surface of the rod engaging said slanting surface and means supporting the rod and wedge for relative rotary movement whereby upon imparting such relative rotary movement, the axial position of the first-mentioned surface on the head varies in acordance with two opposite positions of engagement of the second surface on the head with the slanting surface on the wedge so as to dispose the first-mentioned surface in either an operative or inoperative position relative to the movable component when a memory is moved past such component.

2. A memory as claimed in claim 1 in which said head is in the shape of a hook and said second surface of the head being constituted by the nose of the hook.

3. A memory as claimed in claim 1 and resilient means operably associated with the rod for biasing the same into engagement with the wedge.

4. A memory as claimed in claim 1 in which said head is in the shape of a hook terminating in a nose, resilient means operably associated with said rod for biasing the nose into engagement with the slant surface of the wedge and the slant surface of the wedge having a groove therein receiving the nose.

References Cited by the Examiner

UNITED STATES PATENTS

| | | | |
|---|---|---|---|
| 2,444,495 | 7/1948 | Chase | 74—568 |
| 2,458,752 | 1/1949 | Waidelich. | |

BROUGHTON G. DURHAM, *Primary Examiner.*

MILTON KAUFMAN, *Examiner.*